United States Patent
Patoglu (10) Patent No.: US 10,018,238 B2
(45) Date of Patent: Jul. 10, 2018

(54) VARIABLE NEGATIVE STIFFNESS ACTUATION

(71) Applicant: Sabanci University, Orhanli-Tuzla, Istanbul (TR)

(72) Inventor: Volkan Patoglu, Tuzla-Istanbul (TR)

(73) Assignee: SABANCI UNIVERSITY, Istanbul (TR)

(*) Notice: Subject to any disclaimer, the term of this patent is extended or adjusted under 35 U.S.C. 154(b) by 0 days.

(21) Appl. No.: 14/527,077

(22) Filed: Oct. 29, 2014

(65) Prior Publication Data
US 2015/0123417 A1 May 7, 2015

Related U.S. Application Data

(60) Provisional application No. 61/898,755, filed on Nov. 1, 2013.

(51) Int. Cl.
*F16F 7/00* (2006.01)
*B25J 19/00* (2006.01)
*B25J 19/06* (2006.01)

(52) U.S. Cl.
CPC .............. *F16F 7/00* (2013.01); *B25J 19/0091* (2013.01); *B25J 19/068* (2013.01)

(58) Field of Classification Search
CPC .............. B25J 1/00; B25J 1/02; B25J 18/002
See application file for complete search history.

(56) References Cited

U.S. PATENT DOCUMENTS

| | | | |
|---|---|---|---|
| 7,909,810 B2* | 3/2011 | Noone | A61M 25/10 604/104 |
| 8,232,858 B1 | 7/2012 | Garcia et al. | |
| 8,593,035 B2* | 11/2013 | Asada | H02N 2/02 310/328 |
| 2003/0200749 A1 | 10/2003 | Bromley et al. | |
| 2004/0032000 A1* | 2/2004 | Ma | H01H 1/0036 257/415 |

(Continued)

FOREIGN PATENT DOCUMENTS

| JP | H06003529 U | 1/1994 |
|---|---|---|
| JP | H11198083 | 7/1999 |
| JP | 2011083884 A | 4/2011 |

OTHER PUBLICATIONS

Teter, JR.; "A Discussion of Zero Spring Rate Mechanisms Used for the Active Isolation Mount Experiment"; NASA/TM-1999-209723; Nov. 1999; pp. 1-11.

(Continued)

*Primary Examiner* — Nicholas Kiswanto
(74) *Attorney, Agent, or Firm* — Pearne & Gordon LLP (57) ABSTRACT

An actuator includes an effective stiffness. The effective stiffness is based at least in part on non-linear deflection characteristics of buckling. A method of varying an effective stiffness of an actuator includes providing an actuator and varying an effective stiffness of the actuator based at least in part on non-linear deflection characteristics of buckling. Another method of varying an effective stiffness of an actuator includes applying a load to a member. The load causes the member to buckle, and the buckling produces non-linear deflection of the member. The method further includes varying an effective stiffness of an actuator based at least in part on the non-linear deflection of the member.

16 Claims, 9 Drawing Sheets

(56) References Cited

U.S. PATENT DOCUMENTS

2011/0109198 A1  5/2011  Asada et al.

OTHER PUBLICATIONS

Wolf, et al.; "A New Variable Stiffness Design: Matching Requirements of the Next Robot Generation"; 2008 IEEE International Conference on Robotics and Automation; May 19-23, 2008; pp. 1741-1746.

Jafari, et al.; "A Novel Actuator with Adjustable Stiffness (AwAS)"; The 2010 IEEE/RSJ International Conference on Intelligent Robots and Systems; Oct. 18-22, 2010; pp. 4201-4206.

Yu, et al.; "A Novel Compact Compliant Actuator Design for Rehabilitation Robots"; 2013 IEEE International Conference on Rehabilitation Robotics; Jun. 24-26, 2013.

Li, et al.; "A Tunable "Negative" Stiffness System for Vibration Control"; Proc. of SPIE vol. 8341 834122; Dated 2012; pp. 1-11.

Hollander, et al.; "Adjustable Robotic Tendon using a 'Jack Spring'"; Proceedings of the 2005 IEEE 9th International Conference on Rehabilitation Robotics; Jun. 28-Jul. 1, 2005; pp. 113-118.

Chen, et al.; "An Adjustable Constant-Force Mechanism for Adaptive End-Effector Operations"; Journal of Mechanical Design; Mar. 2012; vol. 134 / 031005; pp. 1-9.

Jafari, et al.; "AwAS-II: A New Actuator with Adjustable Stiffness based on the Novel Principle of Adaptable Pivot point and Variable Lever ratio"; 2011 IEEE International Conference on Robotics and Automation; May 9-13, 2011; pp. 4638-4643.

Petit, et al.; "Bidirectional Antagonistic Variable Stiffness Actuation: Analysis, Design & Implementation"; 2010 IEEE International Conference on Robotics and Automation; May 3-8, 2010; pp. 4189-4196.

Cazottes, et al.; "Bistable Buckled Beam: Modeling of Actuating Force and Experimental Validations"; Journal of Mechanical Design; Oct. 2009; vol. 131 / 101001; pp. 1-10.

Vanderborght, et al.; "Comparison of Mechanical Design and Energy Consumption of Adaptable, Passive-compliant Actuators"; The International Journal of Robotics Research; vol. 28, No. 1, Jan. 2009; pp. 90-103.

Van Ham, et al.; "Compliant Actuator Designs"; IEEE Robotics & Automation Magazine; Sep. 2009; pp. 81-94.

Morita, et al.; "Design and Development of a new Robot Joint using a Mechanical Impedance Adjuster"; IEEE International Conference on Robotics and Automation; 1995; pp. 2469-2475.

Kawamura, et al.; "Development of Passive Elements with Variable Mechanical Impedance for Wearable Robots"; Proceedings of the 2002 IEEE International Conference on Robotics & Automation; May 2002; pp. 248-253.

Schiavi, et al.; "VSA-II: a Novel Prototype of Variable Stiffness Actuator for Safe and Performing Robots Interacting with Humans"; IEEE International Conference on Robotics and Automation; May 19-23, 2008; pp. 2171-2176.

Lakes, et al.; "Extreme damping in composite materials with negative-stiffness inclusions"; Nature; vol. 410; Mar. 29, 2001; pp. 565-567.

Wang, et al.; "Extreme stiffness systems due to negative stiffness elements"; American Journal of Physics; vol. 72, No. 1; Jan. 2004; pp. 40-50.

Bicchi, et al.; "Fast and "Soft-Arm" Tactics"; IEEE Robotics & Automation Magazine; Jun. 2004; pp. 22-33.

English, et al.; "Mechanics and stiffness limitations of a variable stiffness actuator for use in prosthetic limbs"; Mechanism and Machine Theory 34; 1999; pp. 7-25.

Holst, et al.; "Modeling and Experiments of Buckling Modes and Deflection of Fixed-Guided Beams in Compliant Mechanisms"; Journal of Mechanical Design; May 2011, vol. 133; pp. 1-10.

Platus; "Negative-stiffness-mechanism vibration isolation systems"; SPIE vol. 1619 Vibration Control in Microelectronics, Optics, and Metrology; 1991; pp. 44-54.

Migliore, et al.; "Novel Nonlinear Elastic Actuators for Passively Controlling Robotic Joint Compliance"; ASME vol. 129; Apr. 2007; pp. 406-412.

Saif; "On a Tunable Bistable MEMS—Theory and Experiment"; Journal of Microelectromechanical Systems; vol. 9, No. 2; Jun. 2000; pp. 157-170.

Tokatli, et al.; "Optimal Design of a Micro Series Elastic Actuator"; Proceedings of the ASME 2010 International Design Engineering Technical Conferences & Computers and Information in Engineering Conference; Aug. 15-18, 2010; pp. 1-8.

Yamaguchi, et al.; "Realization of Dynamic Biped Walking Varying Joint Stiffness Using Antagonistic Driven Joints"; Proceeding of the IEEE International Conference on Robotics & Automation; May 1998; pp. 2022-2029.

Tokatli, et al.; "Series Elastic Actuation for Force Controlled Micro-Manipulation"; IEEE International Conference on Mechatronics; 2011.

Zaccaria, et al; "Structures buckling under tensile dead load"; Proceedings of The Royal Society A; vol. 467; Jan. 12, 2011; pp. 1686-1700.

Bigoni, et al.; "Effects of constraint curvature on structural instability: tensile buckling and multiple bifurcations"; arXiv:1201.4701v1; Jan. 23, 2012; pp. 1-17.

Visser, et al.; "Variable Stiffness Actuators: a Port-based Analysis and a Comparison of Energy Efficiency"; IEEE International Conference on Robotics and Automation; May 3-8, 2010; pp. 3279-3284.

Matoba H. et al.: "A bistable snapping microacuator", Micro Electro Mechanical Systems, 1994, MEMS 94, Proceedings, IEEE Workshop on OISO, Japan Jan. 25-28, 1994, New York, NY, USA, IEEE, Jan. 25, 1994 (Jan. 25, 1994), pp. 45-50.

* cited by examiner

VARIABLE NEGATIVE STIFFNESS ACTUATION

RELATED APPLICATION

The application claims the benefit of U.S. Provisional Application No. 61/898,755 filed Nov. 1, 2013, and incorporated herein by reference in its entirety.

TECHNICAL FIELD

The disclosure relates generally to actuation apparatus and methods and, more particularly, to variable negative stiffness actuation apparatus and methods.

BACKGROUND

Actuators are known to convert energy into motion. By varying a stiffness of an actuator, one can better control the motion of the actuator. Methods and apparatus for varying a stiffness of an actuator are desirable.

SUMMARY

The following presents a simplified summary of the disclosure in order to provide a basic understanding of some example aspects described in the detailed description.

In a first aspect of the disclosure, a method of varying an effective stiffness of an actuator includes providing an actuator. The method further includes varying an effective stiffness of the actuator based at least in part on non-linear deflection characteristics of buckling.

In one example of the first aspect, varying the effective stiffness includes applying a load to a member. In one example, the load causes the member to buckle and the buckling of the member defines at least in part the non-linear deflection characteristics of buckling. In another example, the load is a compressive load. In still another example, the load is a tensile load. In still another example, the load is a bending load. In yet another example, the load is a torsional load.

In another example of the first aspect, the method further includes varying a stiffness of the member. The stiffness of the member is based at least in part on the non-linear deflection characteristics of buckling. Varying the stiffness of the member varies the effective stiffness of the actuator.

In yet another example of the first aspect, the method further includes varying the effective stiffness of the actuator not based at least in part on non-linear deflection characteristics of buckling.

In still another example of the first aspect, the method further includes controlling a position of an end effector of the actuator based at least in part on a force applied to the end effector. In one example, the force applied to the end effector causes a deflection of the end effector. In another example, the method further includes estimating the force applied to the end effector based at least in part on the deflection of the end effector and the effective stiffness of the actuator. In yet another example, the method further includes controlling the position of the end effector based at least in part on the estimated force.

The first aspect may be provided alone or in combination with one or any combination of the examples of the first aspect discussed above.

In a second aspect of the disclosure, a method of varying an effective stiffness of an actuator includes applying a load to a member. In one example, the load causes the member to buckle, and the buckling produces non-linear deflection of the member. In still another example, the method further includes varying an effective stiffness of an actuator based at least in part on the non-linear deflection of the member.

In one example of the second aspect, a stiffness of the member is based at least in part on the non-linear deflection of the member. The method further includes varying the stiffness of the member. Varying the stiffness of the member varies the effective stiffness of the actuator.

In another example of the second aspect, the method further includes varying the effective stiffness of the actuator not based at least in part on the non-linear deflection of the member.

The second aspect may be provided alone or in combination with one or any combination of the examples of the second aspect discussed above.

In a third aspect of the disclosure, an actuator includes an effective stiffness. The effective stiffness is based at least in part on non-linear deflection characteristics of buckling.

In one example of the third aspect, the actuator further includes a member defining at least in part the effective stiffness of the actuator. The actuator further includes a loading module configured to apply a load to the member. In one example, the load causes the member to buckle, and the buckling produces non-linear deflection of the member. The effective stiffness of the actuator is based at least in part on the non-linear deflection of the member.

In another example of the third aspect, a stiffness of the member is based at least in part on the non-linear deflection of the member. The actuator further includes a controller configured to vary the stiffness of the member. Varying the stiffness of the member varies the effective stiffness of the actuator.

In yet another example, the loading module is configured to apply at least one of a compressive load, a tensile load, a bending load, and a torsional load to the member.

In still another example of the third aspect, the actuator further includes an end effector connected to the member. In one example, the actuator further includes a positioning module configured to control a position of the end effector.

In still another example, the positioning module is configured to control the position of the end effector based at least in part on a force applied to the end effector.

In still another example, the force applied to the end effector causes a deflection of the end effector. In one example, the controller is configured to estimate the force applied to the end effector based at least in part on the deflection of the end effector and the effective stiffness of the actuator. In another example, the positioning module is configured to control the position of the end effector based at least in part on the estimated force.

The third aspect may be provided alone or in combination with one or any combination of the examples of the third aspect discussed above.

BRIEF DESCRIPTION OF THE DRAWINGS

These and other aspects are better understood when the following detailed description is read with reference to the accompanying drawings, in which.

DETAILED DESCRIPTION

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Actuators can be used in a variety of applications to convert energy to motion, including but not limited to applications involving robotics, human-machine interaction, exoskeletons, prosthetic devices, rehabilitation and service robots as well as other areas of technology where a control system acts upon an environment. In some examples, an actuator can include an end effector that interacts with the environment in various ways depending on the particular application. The present disclosure is to be understood to include all types of actuators, including any device configured to convert energy to motion such as hydraulic, pneumatic, electric, and mechanical actuators, as well as other actuators not explicitly described herein. An actuator has a stiffness (e.g. an effective stiffness) which, in some examples, can be defined at least in part by the stiffness (e.g. compliance, impedance) of the end effector. A variable stiffness actuator has a stiffness (e.g. an effective stiffness) that can be varied (e.g. controlled, modulated) to include a range of stiffnesses. The present disclosure describes apparatus and methods for varying a stiffness of an actuator. In particular, the present disclosure describes apparatus and methods for varying a stiffness of an actuator based at least in part on non-linear deflection characteristics of buckling (e.g. variable negative stiffness). In some examples, the apparatus and methods described herein can vary a stiffness of an actuator to include at least one of a positive stiffness, a zero stiffness, and a negative stiffness. Furthermore, the particular example types of actuators as well as the particular example manners by which non-linear deflection due to buckling (e.g. negative stiffness) is produced are to be understood as examples and should not be construed to limit the scope of the disclosure.

Example methods of varying a stiffness of an actuator will now be described. One method includes providing an actuator. The actuator can be any actuator having a stiffness (e.g. an effective stiffness), including but not limited to the various example actuators described herein. The method can further include varying the effective stiffness of the actuator based at least on part on non-linear deflection characteristics of buckling (e.g. negative stiffness). Non-linear deflection characteristics of buckling can include any result, attribute, behavior, or other effect brought about by buckling, including any change with respect to force-displacement characteristics of a member. For example, varying the stiffness can include applying a load to a member. The member can include a beam, a shaft, a column, a rod, a spring, a plate, a shell, or any other structure that can buckle and thereby exhibit non-linear deflection characteristics of buckling. Furthermore, the member can be supported with any end condition or constraint, including but not limited to simply supported, pinned, clamped, free, and any other boundary condition including those not explicitly described herein. Further, the load can be applied in any manner, including but not limited to, a manually applied load, a dead load, a spring load, a mechanically applied or mechanically adjustable load, such as a load applied by an actuator or other device, as well as other methods or apparatus configured to apply a load to a member. In one example, the load (e.g. a load greater than or equal to a critical buckling load of the member) can cause the member to buckle (e.g. experience unstable equilibrium or other instability resulting in a failure mode) and exhibit non-linear deflection characteristics (e.g. a corresponding change in a stiffness of the member, such as a zero or negative stiffness). The buckling of the member can define at least in part the non-linear deflection characteristics of buckling. Further, a stiffness of the member can be based at least in part on the non-linear deflection characteristics of buckling. In another example, the load can be a compressive load. In still another example, the load can be a tensile load. In still another example, the load can be a bending load. In yet another example, the load can be a torsional load. Buckling of the member can include at least one of compressive buckling, tensile buckling, bending buckling, and torsional buckling. The at least one of compressive buckling, tensile buckling, bending buckling, and torsional buckling can produce any one or more non-linear deflection characteristics of buckling. As noted, the effective stiffness of the actuator is based at least in part on the non-linear deflection characteristics of buckling. For example, the stiffness of the actuator (e.g. effective stiffness) can be based at least in part on the non-linear deflection characteristics (e.g. negative stiffness) of the member as a result of the applied load that causes the member to buckle. The method can further include varying a stiffness of the member. Varying a stiffness of the member varies the effective stiffness of the actuator. In one example, varying the stiffness of the member can include varying the load applied to the member. In other examples, varying the stiffness of the member can include varying any characteristic of the member that affects a stiffness (e.g. transverse stiffness, axial stiffness, torsional stiffness, bending stiffness, rotational stiffness) of the member. Some examples include varying a dimension of the member (e.g. length, width) as well as varying a cross-sectional area of the member. Other examples include varying a material of the member or a material property of the member as well as varying a boundary condition by which the member is constrained. Still other examples, including those not explicitly described herein, can be used to vary the stiffness of the member. In an example where the stiffness of the member is varied by varying the load applied to the member, the load can be varied within a range that includes loads that produce non-linear deflection characteristics of buckling (e.g. negative stiffness). Accordingly, varying the load in a manner that varies the stiffness of the member to include a negative stiffness can vary the stiffness (e.g. effective stiffness) of the actuator (e.g. variable negative stiffness actuation).

It is to be understood that the effective stiffness of the actuator can also be based on other characteristics that are not based on non-linear deflection characteristics of buckling. For example, the method can further include varying the effective stiffness of the actuator not based at least in part on non-linear deflection characteristics of buckling. For instance, applying a load to the member that does not cause the member to buckle can produce other characteristics (e.g. a corresponding change in stiffness of the member, such as a positive stiffness). The load applied to the member can be varied within a range that includes loads that produce the other characteristics. As noted, varying the load varies the stiffness of the member which in turn varies the stiffness (e.g. effective stiffness) of the actuator. Accordingly, the load applied to the member can vary the stiffness of the member to include one or more positive stiffnesses, a zero stiffness, and one or more negative stiffnesses. In turn, the effective stiffness of the actuator can be varied to include a corresponding range of stiffnesses, including one or more positive stiffnesses, a zero stiffness, and one or more negative stiffnesses (if counterbalanced). Varying the effective stiffness of the actuator based on other characteristics can include varying a stiffness of the member by any of the apparatus and methods discussed herein as well as by any other apparatus and methods not explicitly disclosed herein. Similarly, applying a load to the member and varying the load applied to the member can include applying a load and varying the load using any of the apparatus and methods described herein as well as any apparatus and methods not explicitly disclosed herein.

In still another example, the method can further include controlling a position of an end effector of the actuator based at least in part on a force applied to the end effector. In one example, the force applied to the end effector can cause a deflection of the end effector. In another example, the method can further include estimating the force applied to the end effector based at least in part on the deflection of the end effector and the effective stiffness of the actuator (e.g. $F=k \cdot \Delta x$). In yet another example, the method can further include controlling the position of the end effector based at least in part on the estimated force. Controlling the position of the end effector based at least in part on the force applied to the end effector can provide an actuator that is actively backdriveable. For example, by actively positioning (e.g. driving) the end effector in a direction of the applied force until an interaction force realized at the end effector becomes zero, one can provide an actuator that is actively backdriveable under force control. The actively backdriveable actuator can be one that, ordinarily, is non-backdriveable (e.g. passively non-backdriveable).

Based on the manner by which the force applied to the end effector is estimated, it can be shown that the smaller the stiffness of the actuator, the better the force estimate (e.g. the higher the resolution of the force estimate). Higher resolution force estimates can in turn be used to provide better control of the position of the end effector (e.g. force tracking). Therefore, by decreasing the stiffness of the actuator, one can increase force estimate resolution and achieve better force tracking performance. As noted, by applying a load to the member that causes the member to buckle, the member thereby exhibiting non-linear deflection due to buckling, the stiffness of the member can be controlled to include non-linear deflection characteristics of buckling (e.g. at least one of a zero stiffness and a negative stiffness). In turn, by varying the stiffness of the member to include the at least one of the zero stiffness and the negative stiffness, the effective stiffness of the actuator which is based at least in part on the non-linear deflection characteristics can also be varied to include any range of stiffness, including a positive effective stiffness, an effective stiffness that approaches zero, a zero effective stiffness, and a negative effective stiffness (if counterbalanced).

As noted, by decreasing the effective stiffness of the actuator, one can achieve better force control (e.g. higher resolution) of the position of the end effector with respect to the load applied to the end effector. It should be noted that while decreasing the effective stiffness of the actuator improves the force estimates and position control, the bandwidth of the overall system also reduces. In certain situations a limited bandwidth can be desirable. In other instances a limited bandwidth can be undesirable. Thus, the above noted methods of varying the stiffness of the actuator can be used to vary the stiffness of the actuator which also varies the overall bandwidth of the system. Different actuator stiffnesses may be desired depending on, for example, the task the actuator may perform. For example, if fast movements of the actuator without contact of the end effector (e.g. positioning in free space) are desired, one can increase the stiffness of the actuator, resulting in a higher bandwidth. Likewise, if force control of the actuator is desired, one can decrease the stiffness of the actuator, resulting in a lower bandwidth. Decreasing the stiffness of the actuator can also be used to ensure compliance (e.g. safety during operation) when the end effector is in the vicinity of humans or when the end effector may experience impacts from externally applied loads. Other instances or applications where variable stiffness actuation can be advantageous are also contemplated herein.

Figure 1:
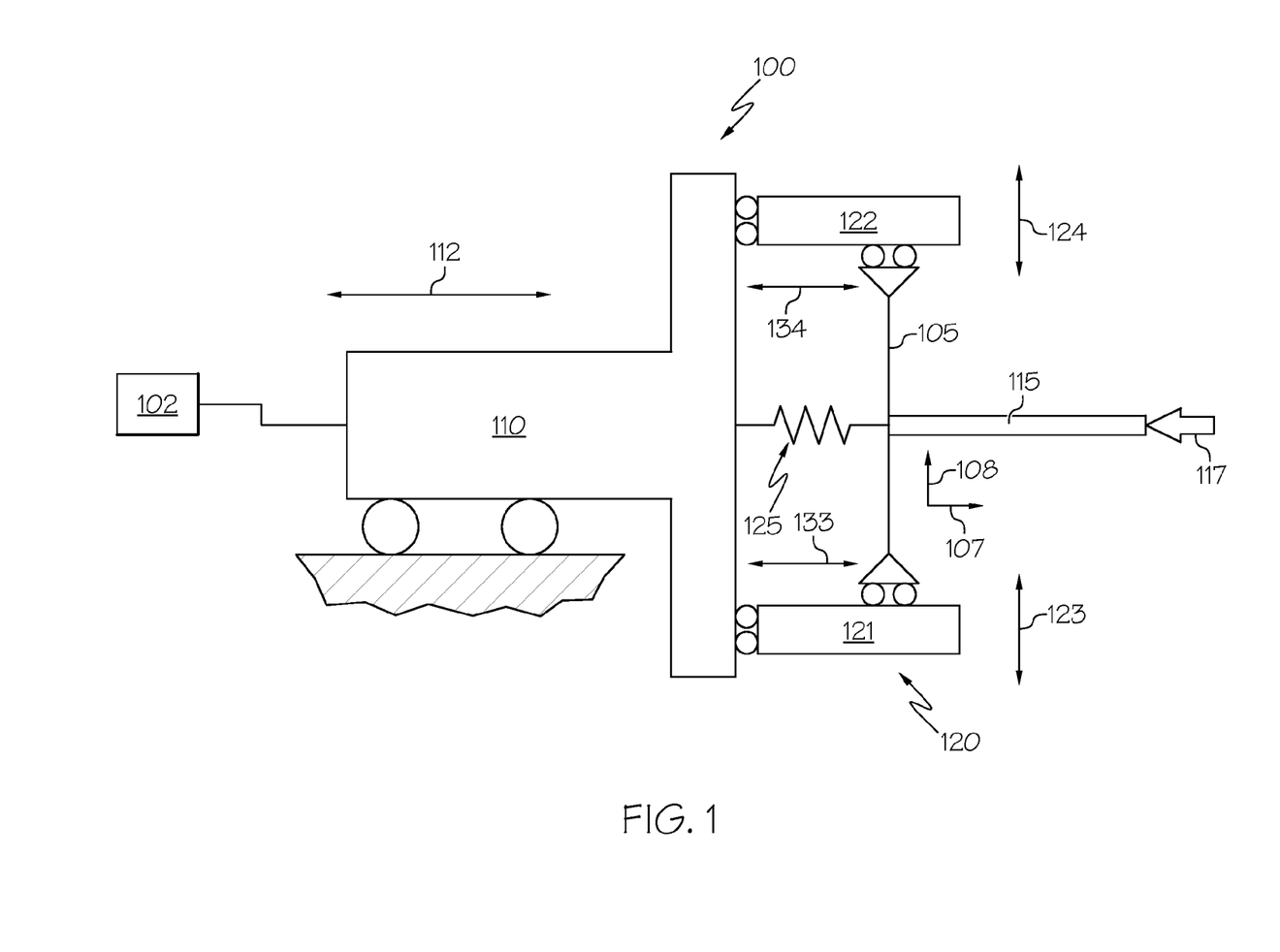
FIG. 1 illustrates an example actuator in accordance with the disclosure.

Various example actuators will now be described. Referring to FIG. 1, a first example actuator 100 is provided with various example features that can be used either alone or in combination to vary an effective stiffness of the first example actuator 100. The stiffness of the first example actuator 100 is based at least in part on non-linear deflection characteristics of buckling. For example, the first example actuator 100 can include a first example member 105 defining at least in part the stiffness of the first example actuator 100. The first example actuator 100 can further include a first example loading module 120 configured to apply a load to the first example member 105. The first example member 105 can be constrained or supported in any manner, including a roller support configured to allow the member to slide at either end thereof in a direction shown by arrows 133 and 134. The first example loading module 120 can include any device configured to apply a load to a member. For example, the first example loading module 120 can include one or more actuators configured to convert energy into motion, wherein the motion applies one or more loads to one or more members. In one example, the load causes the first example member 105 to buckle. In another example, the buckling produces non-linear deflection of the first example member 105. The stiffness of the first example actuator 100 can be based at least in part on the non-linear deflection (e.g. negative stiffness) of the first example member 105.

The first example actuator 100 can further include a first example controller 102 configured to vary the load applied to the first example member 105 by the first example loading module 120. Varying the load varies the stiffness of the first example actuator 100. Although illustrated as a separate controller, it is to be understood that the first example controller 102 can be integral to the first example actuator 100 as well as integral to any one or more components of the first example actuator 100. Additionally, the first example controller 102 can include any one or more of a microcontroller, programmable logic controller (PLC), discrete controller, circuit, encoder, sensor, or other controller. As will be discussed more fully below, the loading module can be configured to apply at least one of a compressive load, a tensile load, a bending load, and a torsional load to a member. The at least one of a compressive load, a tensile load, a bending load, and a torsional load can cause the member to buckle. The buckling of the member can produce the non-linear deflection characteristics of buckling. As noted, the stiffness of the actuator can be based at least in part on the non-linear deflection characteristics of buckling. In other examples, the stiffness of the actuator can be based not at least in part on non-linear deflection characteristics of buckling. Accordingly, by varying the load applied to the member, one can vary the stiffness of the actuator.

As shown in FIG. 1, the first example loading module 120 can include at least one of a first loading unit 121 that can apply a load in a direction shown by arrow 123 and a second loading unit 122 that can apply a load in a direction shown by arrow 124. The at least one of the first loading unit 121 and the second loading unit 122 can include any device configured to apply a load to the first example member 105. For example, the at least one of the first loading unit 121 and the second loading unit 122 can include any one or more actuators configured to convert energy into motion, wherein the motion applies one or more loads to one or more members, including, for example, the first example member 105. In one example, the first example loading module 120 can apply a tensile load (a tensile axial force in the direction of axis 108) to the first example member 105, which in turn increases a transverse stiffness (measured in the direction of axis 107) of the first example member 105 (e.g. a positive stiffness). By increasing the transverse stiffness of the first example member 105, the effective stiffness of the first example actuator 100 also increases, with the understanding that the larger the tensile load applied to the member, the greater the transverse stiffness of the first example member 105, and thus the greater the effective stiffness of the first example actuator 100. In another example, the first example loading module 120 can apply a compressive load (a compressive axial load in a direction opposite the direction of the tensile load) to the first example member 105, which in turn decreases the transverse stiffness of the first example member 105. By decreasing the transverse stiffness of the first example member 105, the effective stiffness of the first example actuator 100 also decreases. For compressive loads less than, for example, a critical buckling load of the first example member 105, the transverse stiffness of the first example member 105 remains positive and the deflection of the first example member 105 due to the loading can be assumed to behave linearly, with the understanding that the larger the compressive load on the member, the smaller the transverse stiffness of the member, and thus the smaller the effective stiffness of the first example actuator 100. For compressive loads greater than or equal to the critical buckling load of the first example member 105, the member will exhibit non-linear deflection characteristics of buckling (e.g. the member will buckle). In another examples, by applying a load that is not centered with respect to an axis of the member (e.g. an eccentric load), buckling by bending can be achieved and the member can exhibit non-linear deflection characteristics due to bending. By exhibiting non-linear deflection characteristics of buckling, the transverse stiffness of the first example member 105 can be zero or negative. Correspondingly, depending on the presence or absence of other features that influence the effective stiffness of the first example actuator 100, the effectives stiffness of the first example actuator 100 can be positive, approaching zero, zero, or negative (if counterbalanced), based at least in part on the zero or negative transverse stiffness of the first example member 105. As a result, the first example actuator 100 can be considered a variable negative stiffness actuator, having an effective stiffness that can be varied (e.g. modulated) over a range of stiffnesses, including positive, zero, and negative stiffness. Moreover, by basing the effective stiffness of the first example actuator 100 at least in part on non-linear deflection characteristics of buckling, the effective stiffness of the first example actuator 100 can be varied to include low effective stiffnesses without sacrificing the mechanical integrity and load bearing capability of the first example actuator 100.

The first example actuator 100 can further include a first example end effector 115 connected to the first example member 105. In one example, the first example actuator 100 can include a first example positioning module 110 configured to control a position of the first example end effector 115. The first example positioning module 110 can include any device configured to control a position of the first example end effector 115. For example, the first example positioning module 110 can include one or more actuators configured to convert energy into motion, wherein the motion controls a position of the first example end effector 115. In another example, the first example positioning module 110 can be configured to control the position of the first example end effector 115 (e.g. in a direction as shown by arrow 112) based at least in part on a force 117 applied to the first example end effector 115. Controlling the position of the first example end effector 115 based at least in part on the force 117 applied to the first example end effector 115 can provide an actuator that is actively backdriveable. For example, by actively positioning (e.g. driving) the first example end effector 115 with the first example positioning module 110 in a direction of the applied force 117 until an interaction force realized at the first example end effector 115 becomes zero, one can provide an actuator that is actively backdriveable under force control. As noted above, the actively backdriveable actuator can be one that is ordinarily non-backdriveable (e.g. passively non-backdriveable). The first example controller 102 can include a force sensor that can be used to measure the force 117 applied to the first example end effector 115, the value of which can be used to control a position of the first example end effector 115 with the first example positioning module 110. The force 117 applied to the first example end effector 115 can cause a deflection of the first example end effector 115. The first example controller 102 can be configured to estimate the force 117 applied to the first example end effector 115 based at least in part on the deflection of the first example end effector 115 and the effective stiffness of the first example actuator 100. The first example positioning module 110 can be configured to control the position of the first example end effector 115 based at least in part on the estimated force.

In one example, the first example actuator 100 can further include an optional spring 125 having a known stiffness. The optional spring 125 can be provided, for among other reasons, to compensate for instabilities experienced by the first example member 105 when, for example, the first example member 105 exhibits non-linear deflection due to buckling. The optional spring 125 can also be used to provide a desired nominal effective stiffness of the first example actuator 100. In one example, the force 117 applied to the first example end effector 115 can cause a deflection of the first example end effector 115 which results in a deflection in the optional spring 125. The first example controller 102 can be configured to estimate the force applied to the first example end effector 115 based at least in part on the deflection of the optional spring 125 and the known stiffness of the spring (e.g. $F=k \cdot \Delta x$). The first example positioning module 110 can be configured to control the position of the first example end effector 115, as shown by arrow 112, based at least in part on the estimated force. As noted, under such force control, a passively non-backdriveable actuator can be rendered actively backdriveable. It is to be understood that force control of the actuator can be accomplished in other ways not explicitly described herein.

Figure 2:
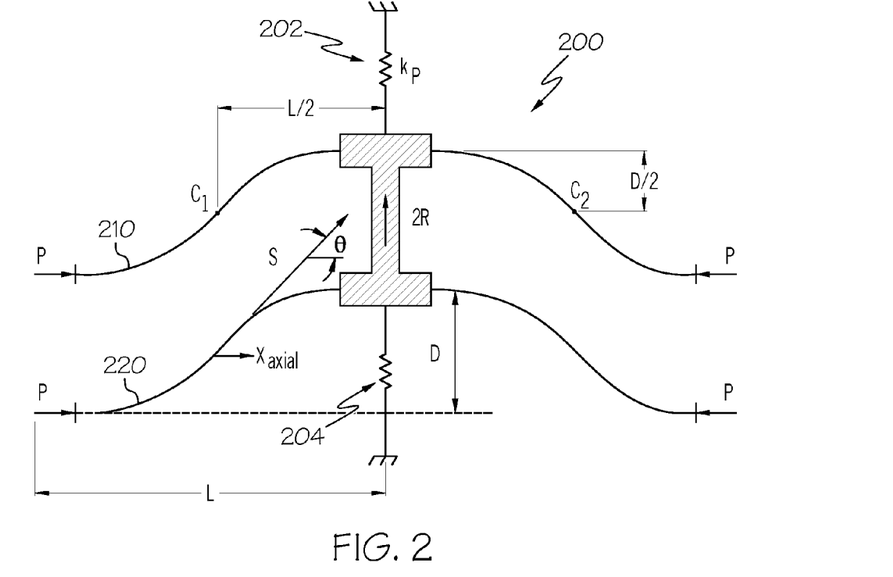
FIG. 2 illustrates an example schematic of an axially loaded buckling beam system.

Turning to FIG. 2, a schematic model 200 of an axially loaded buckling beam system coupled to linear compression springs 202 and 204 is depicted. Linear compression spring 202 can be a positive spring having a stiffness $k_p$. A clamped-clamped boundary condition is depicted for a first buckling beam 210 and a second buckling beam 220. It is to be understood that a similar analysis for other boundary conditions can also be conducted and is within the scope of the disclosure. Further, a first buckling beam 210 and a second buckling beam 220 are shown to ensure uniform axial loading of the beams without inducing moments. However, it is to be understood that a single beam as well as two or more beams could also be used. For purposes of the schematic model 200, half of the axial length of the first buckling beam 210 and the second buckling beam 220 is denoted as L, where D signifies a transverse deflection of the first and second buckling beams 210, 220. An effective axial load applied to the first and second buckling beams 210, 220 is represented with P, while a transverse loading is given as 2R. A path along the deflected first and second buckling beams 210, 220 is measured using the variable S and the angle Ø. The axial direction of the beams is denoted as $X_{axial}$, with the vertical axis lying along the transverse direction (e.g. in the direction of the transverse load 2R). The inflection points of the first and second buckling beams 210 are identified as $C_1$ and $C_2$. The illustrated deflection pattern is valid for small deflections and for axial loadings that are below a second critical buckling load. Introducing the dimensionless variables $\xi=D/2L$ and $\gamma=K/(AE/L)$, where K is a stiffness related to the applied loading P, A is a cross-sectional area of the beam, and E is the elastic modulus of the beam. Invoking a small deflection assumption stating $\xi \ll 1$, with a critical buckling load of the beam being denoted as $P_{cr}$, where $P_{cr}=4\pi^2 EI/L^2$, with I representing the area moment of inertia, a transverse stiffness of the beam can be calculated as $2R/P_{cr}=-K_{b1}\xi+K_{b3}\xi^3$, where $K_{b1}$ and $K_{b3}$ are linear and cubic spring constants for the beam under axial loading P. The linear spring constant $K_{b1}$ can be given as $K_{b1}=(F/(P_{cr}(1+\gamma))-1)\pi^2$. The cubic spring constant $K_{b3}$ can be given as $K_{b3}=((AE\gamma/P_{cr}(1+\gamma))-4/3((F/P_{cr}(1+\gamma))-1))\pi^4$. Accordingly, for different values of axial loading P, a positive, zero, and negative transverse stiffness can be obtained. For example, when a compressive axial force applied to the beam exceeds the first critical buckling load $P_{cr}$ (e.g. $K_{b1}>0$), buckling takes place and negative stiffness behavior of the beam can be observed. Additionally, for tensile axial loading (e.g. $K_{b1}<0$), the beam possesses a positive transverse stiffness that increases as the tension load increases. Based on the foregoing, one can control an effective stiffness of an actuator by controlling a stiffness of a member, wherein the stiffness of the member defines at least in part the effective stiffness of the actuator.

Figure 3:
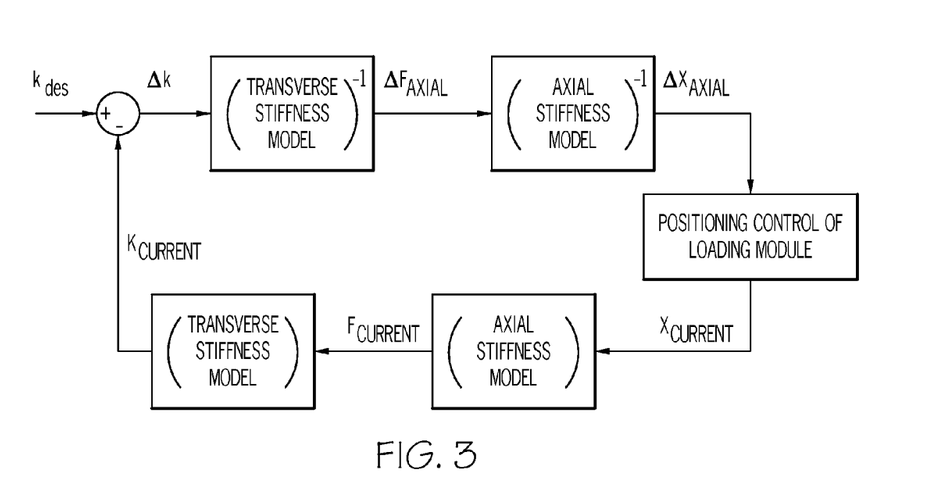
FIG. 3 illustrates an example control schematic in accordance with the disclosure.

Turning to FIG. 3, an example control schematic is provided. The example control schematic can be used to control, vary, or otherwise modulate an effective stiffness of an actuator by determining a prescribed deflection of a member required to achieve a desired stiffness of the member, where the effective stiffness of the actuator is based at least in part on the stiffness of the member. In one example, the transverse stiffness of the member is represented by the equation $2R/P_{cr}=-K_{b1}\xi+K_{b3}\xi^3$, described above. In addition, for axial loads less than the critical buckling load $P_{cr}$, the axial stiffness of the member can be given as $K_e=AE/L$. For axial compressive loads greater than the critical buckling load $P_{cr}$, the axial stiffness of the member can be given as $K_{axial}=K_e K_b/(K_e+K_b)$, where $K_b=P_{cr}/2L$. Accordingly, following the control schematic of FIG. 3, one can designate or input a desired transverse stiffness of the member $k_{des}$. The desired transverse stiffness can be selected, for example, according to a desired effective stiffness of the actuator. Next, based on a current position (e.g. $X_{CURRENT}$) of a loading module that applies a load to the member (e.g. a current amount of deflection of the member due to the applied load) and the above noted axial stiffness model of the member (e.g. $K_{axial}$), one can determine the current force applied to the member (e.g. $F_{CURRENT}$, according to the known relationship $F_{CURRENT}=K_{axial} \cdot X_{CURRENT}$. Based on the current force and the above noted transverse stiffness model (e.g. $2R/P_{cr}=-K_{b1}\xi+K_{b3}\xi^3$), one can estimate the current transverse stiffness (e.g. $K_{CURRENT}$) of the member. Depending on the desired effective stiffness of the actuator, and hence the desired transverse stiffness of the member, ($k_{des}$), one can determine the required change (+/−) in the transverse stiffness of the member (e.g. $\Delta k$) in order to achieve the desired transverse stiffness. Again, based on the transverse stiffness model of the member and the change in transverse stiffness ($\Delta k$), one can determine the required change in force ($\Delta F_{axial}$) applied to the member. Next, based on the axial stiffness model of the member ($K_{axial}$) and the required change in force ($\Delta F_{axial}$), one can determine the required deflection ($\Delta X_{axial}$) of the member in order to achieve the desired loading of the member. Using the required deflection, one can control the position of loading module to impart the required deflection on the member. Thus, based on the example control schematic, one can control the transverse stiffness of the member through position control of the loading module to impart a deflection on the member. The imparted deflection can be used to vary the transverse stiffness of the member which can be used to vary the effective stiffness of the actuator.

Figure 4:
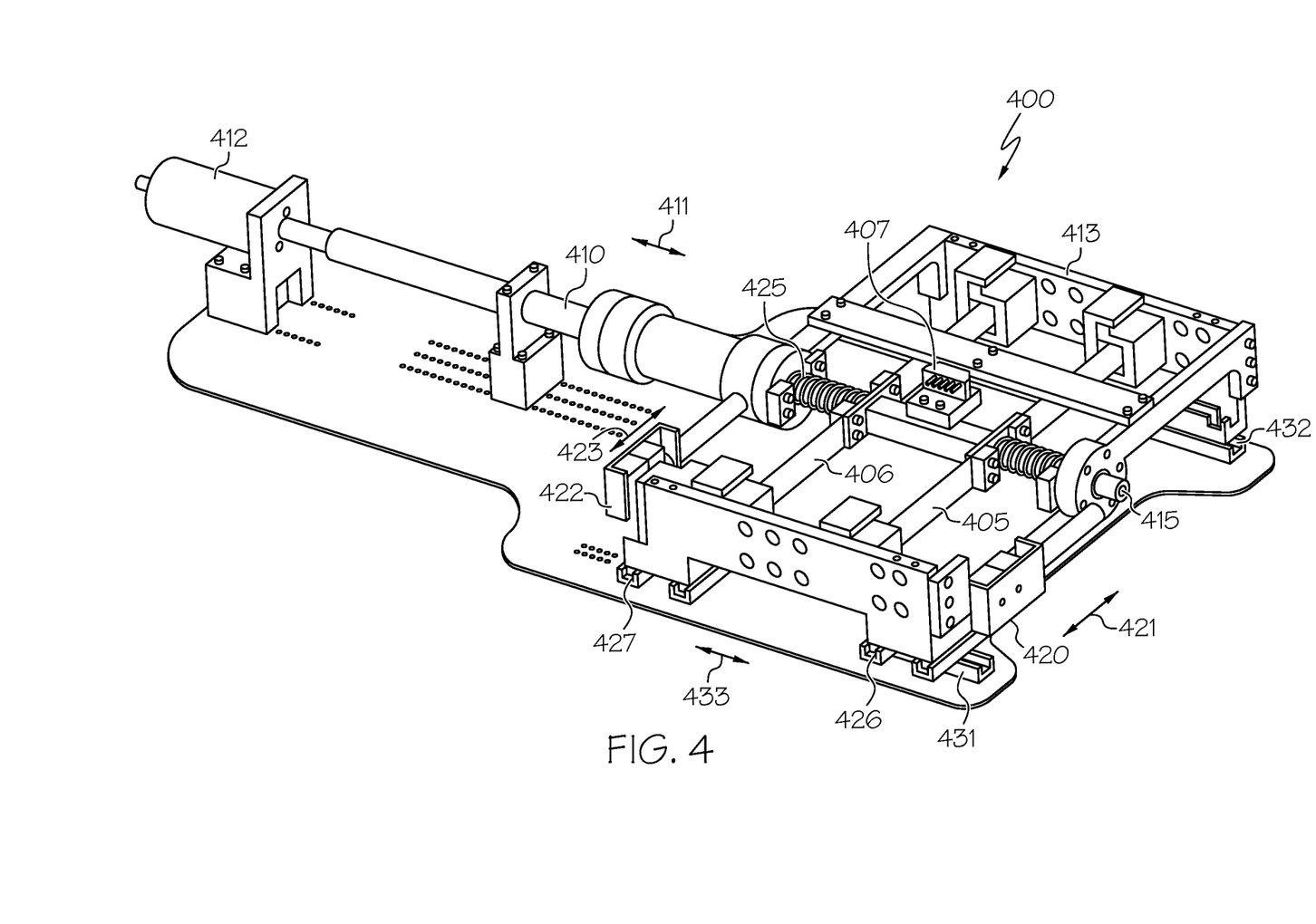
FIG. 4 illustrates an example variable negative stiffness actuator.

Turning to FIG. 4, a second example actuator 400 is provided with various example features that can be used either alone or in combination to vary an effective stiffness of the second example actuator 400. The second example actuator 400 can include an example end effector 415 and a linear positioning actuator 410 configured to position the actuator (e.g. control a position of the example end effector 415). The linear positioning actuator 410 can be controlled with a motor 412 (e.g. a DC motor) that drives a frame 413 along a direction shown by arrow 411. The frame 413 can be mounted on one or more linear sliders 431 and 432 to slide along the direction of motion 433 of the linear positioning actuator 410. The frame 413 can also include one or more loading actuators (e.g. a first loading actuator 420 and a second loading actuator 422). The first and second loading actuators 420, 422 can be configured to load one or more members or leaf springs (e.g. a first leaf spring 405 and a second leaf spring 406). In one example, the first and second loading actuators 420, 422 can be configured to apply a load in a direction shown by arrows 421 and 423 corresponding to an axial direction of the first and second leaf springs 405, 406 which can vary a transverse stiffness of the first and second leaf springs 405, 406. Two loading actuators are used in a symmetrical manner to ensure uniform axial loading of the leaf springs without inducing moments on the leaf springs. In other examples, one, two, three, or more leaf springs may also be used. As shown, the example end effector 415 can be connected to the leaf springs such that a change in stiffness (e.g. transverse stiffness) of the leaf springs changes an effective stiffness of the second example actuator 400 realized at the example end effector 415. Linear sliders 426 and 427 can be provided to enable (e.g. guide) the loading of the leaf springs 405, 406. In one example, the load can be a compressive axial load. In another example, the load can be a tensile axial load. The effective stiffness of the second example actuator 400 can be based at least in part on the transverse stiffness of the leaf springs 405, 406. As described above, a compressive axial load greater than a critical buckling load can cause the leaf springs to buckle and exhibit non-linear deflection characteristics of buckling (e.g. at least one of a zero transverse stiffness and a negative transverse stiffness). Further, a tensile load can increase the transverse stiffness of the leaf springs (e.g. a positive transverse stiffness). Accordingly, by varying the load applied to the leaf springs 405, 406, one can vary the effective stiffness of the second example actuator 400. Optionally, a compression spring 425 can be attached to the leaf springs 405, 406 to set a nominal effective stiffness of the second example actuator 400. Additionally, a linear optical encoder 407 can be provided to measure transverse deflection of the example end effector 415 with respect to the frame 413.

Figure 5A:
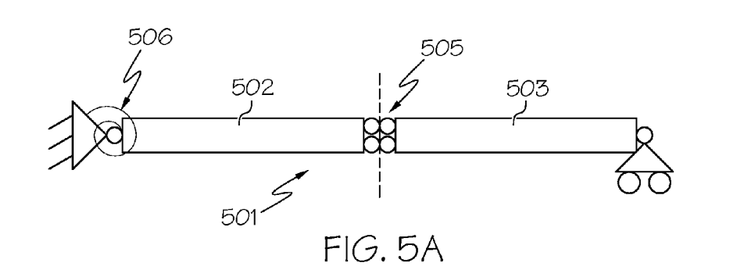
FIGS. 5A, 5B, and 6 illustrate an example actuator based on tensile buckling of rigid members.
Figure 5B:
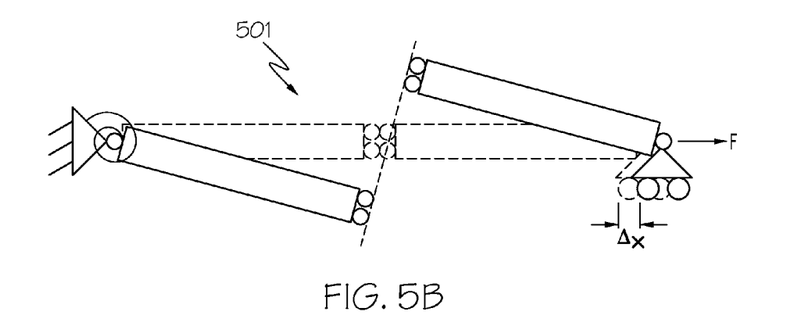
Figure 6:
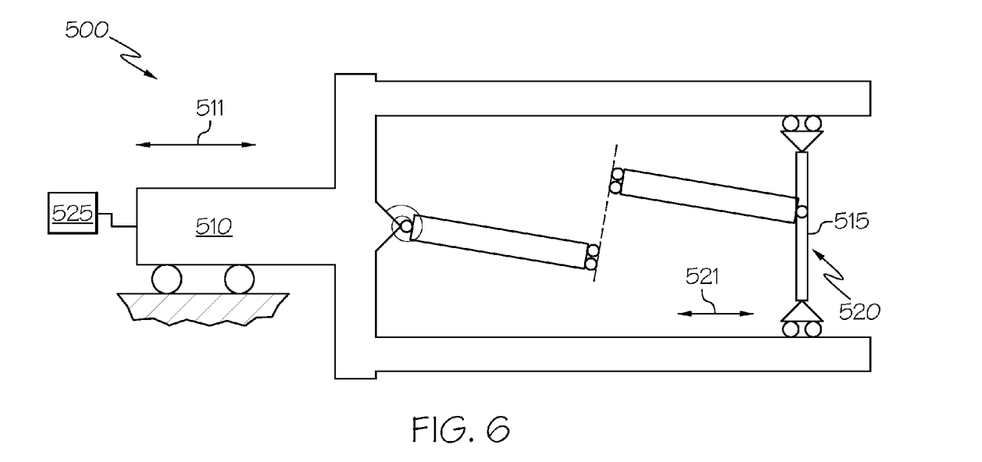

Referring to FIGS. 5A, 5B, and 6, a third example actuator 500 is provided with an effective stiffness based at least in part on non-linear deflection characteristics of tensile buckling. As shown in FIG. 5A, a third example member 501 can include a first rigid member 502 and a second rigid member 503. The first rigid member 502 and the second rigid member 503 can be connected by a sliding mechanism 505 (e.g. a slider). The first rigid member 502 can be pinned at one end to a support and can include a torsional spring 506 that imparts a rotational moment on the first rigid member 502. As shown in FIG. 5B, under a tensile dead load F, the third example member 501 can buckle, and the relationship between the dead load F and the deflection of the member ($\Delta x$) will exhibit non-linear deflection characteristics of tensile buckling (e.g. at least one of a zero stiffness and a negative stiffness). As shown in FIG. 6, the effective stiffness of the third example actuator 500 can be based at least in part on the at least one of a zero stiffness and a negative stiffness of the third example member 501, including the first and second rigid members 502, 503 due to tensile buckling. The third example actuator 500 can further include a third example positioning module 510 having features the same as or similar to those of the first example positioning module 110 and can be configured to control a position of a third example end effector 515 along a direction shown by arrow 511. The third example actuator 500 can also include a third example loading module 520 having features the same as or similar to those of the first example loading module 120 and can be configured to apply a load to the third example member 501 (e.g. in a direction shown by arrow 521) to vary the effective stiffness of the third example actuator 500. It is also to be understood that the third example actuator 500 can include a third example controller 525 having features the same as or similar to those of the first example controller 102 described above and can be configured to implement the various methods of control, including but not limited to, force control of the third example actuator 500.

Figure 7A:
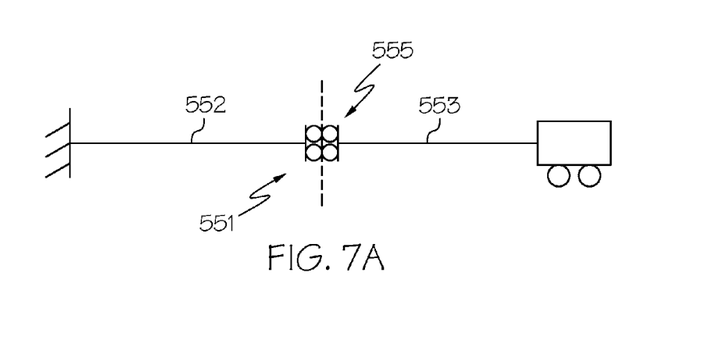
FIGS. 7A, 7B, and 8 illustrate an example actuator based on tensile buckling of bending members.
Figure 7B:
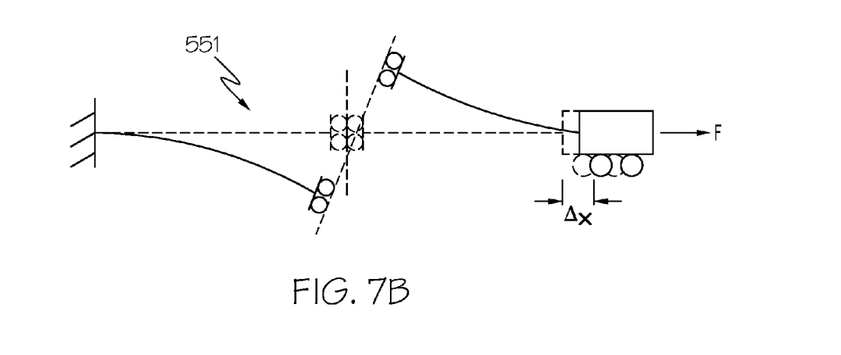
Figure 8:
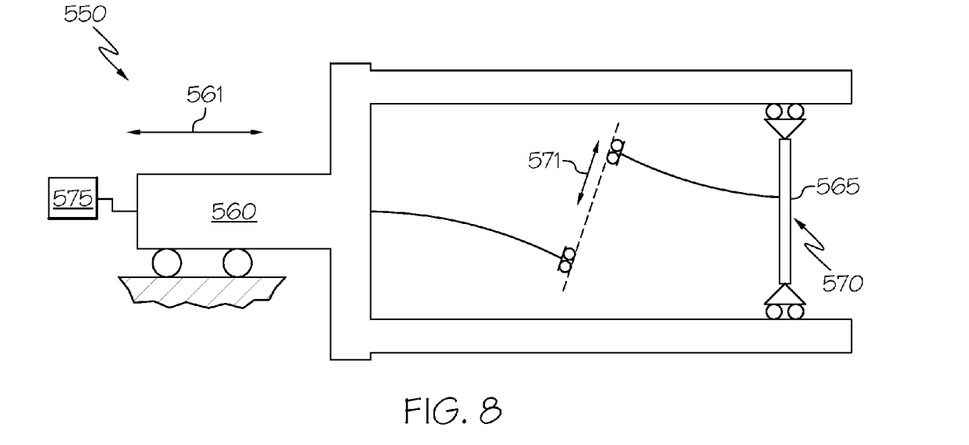

Referring to FIGS. 7A, 7B, and 8, a fourth example actuator 550 is provided with an effective stiffness based at least in part on non-linear deflection characteristics of tensile buckling. As shown in FIG. 7A, a fourth example member 551 can include a first bending member 552 and a second bending member 553. The first bending member 552 and the second bending member 553 can be connected by a sliding mechanism 555 (e.g. a slider). The first bending member 552 can be fixed at one end to a support. As shown in FIG. 7B, under a tensile dead load F, the fourth example member 551 can buckle, and the relationship between the dead load F and the deflection of the fourth example member ($\Delta x$) will exhibit non-linear deflection characteristics of tensile buckling (e.g. at least one of a zero stiffness and a negative stiffness). As shown in FIG. 8, the effective stiffness of the fourth example actuator 550 can be based at least in part on the at least one of a zero stiffness and a negative stiffness of the fourth example member 551, including the first and second bending members 552, 553 due to tensile buckling. The fourth example actuator 550 can further include a fourth example positioning module 560 having features the same as or similar to those of the first example positioning module 110 and the third example positioning module 510 and can be configured to control a position of a fourth example end effector 565 along a direction shown by arrow 561. The fourth example actuator 550 can also include a fourth example loading module 570 having features the same as or similar to those of the first example loading module 120 and the third example loading module 520 and can be configured to apply a load to the fourth example member 551 (e.g. in a direction shown by arrow 571) to vary the effective stiffness of the fourth example actuator 550. It is also to be understood that the fourth example actuator 550 can include a fourth example controller 575 having features the same as or similar to those of the first example controller 102 and the third example controller 525 described above and can be configured to implement the various methods of control, including but not limited to, force control of the fourth example actuator 550.

Figure 9:
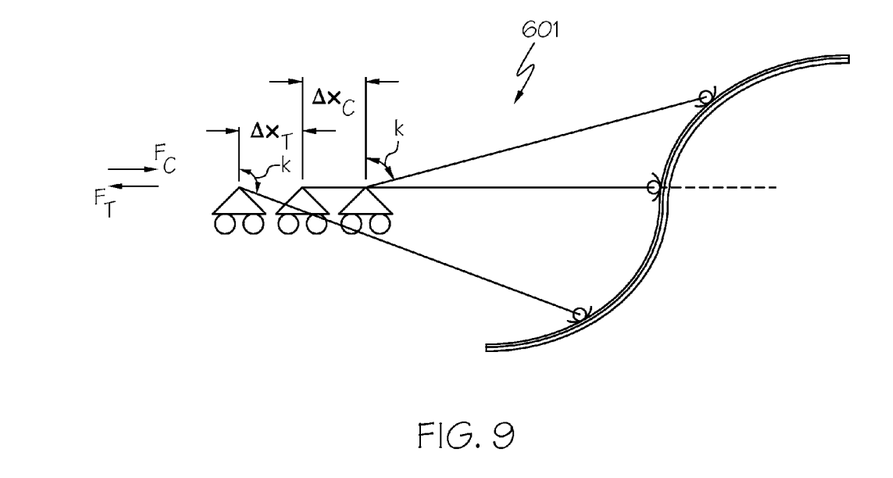
FIGS. 9 and 10 illustrate an example actuator based on both compressive and tensile dead loading.
Figure 10:
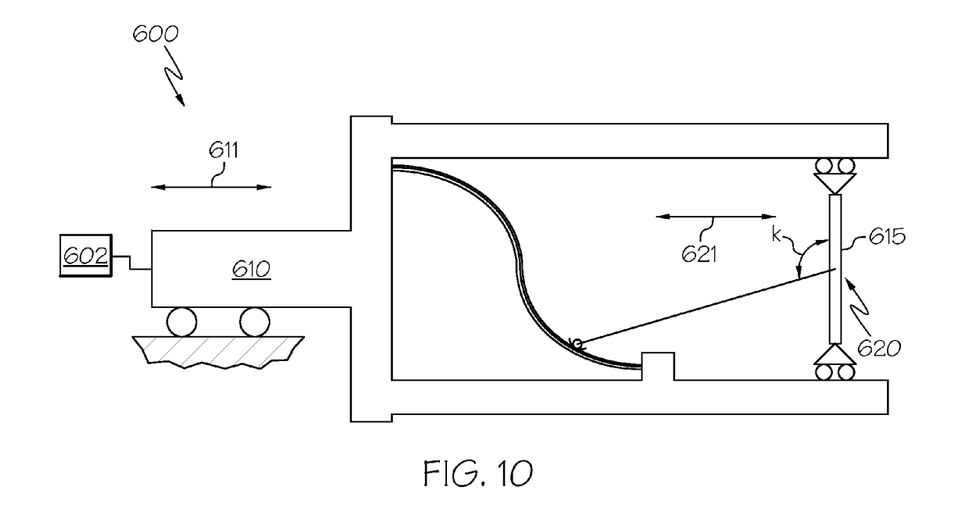

Referring to FIGS. 9 and 10, a fifth example actuator 600 is provided with an effective stiffness based at least in part on non-linear deflection characteristics of both compressive and tensile buckling. FIG. 9 is an example schematic system 601 depicting buckling taking place under both compressive and tensile dead loading. For example, the system will buckle under both compressive and tensile loading and the relationship between an applied load, accounting for a stiffness (k), and a corresponding displacement will exhibit non-linear deflection characteristics of buckling (e.g. at least one of a zero stiffness and a negative stiffness). In one example, for a tensile load ($F_T$), the relationship between the load $F_T$ and the displacement ($\Delta_{xT}$) can produce negative stiffness. In another example, for a compressive load ($F_C$), the relationship between the load $F_C$ and the corresponding displacement ($\Delta_{xC}$) can produce negative stiffness. As shown in FIG. 10, the effective stiffness of the fifth example actuator 600 can be based at least in part on the negative stiffness of the system due to both compressive and tensile buckling. The fifth example actuator 600 can further include a fifth example positioning module 610 having features the same as or similar to those of the first example positioning module 110, the third example positioning module 510, and the fourth example positioning module 560 and can be configured to control a position of a fifth example end effector 615 along a direction shown by arrow 611. The fifth example actuator 600 can also include a fifth example loading module 620 having features the same as or similar to those of the first example loading module 120, the third example loading module 520, and the fourth example loading module 570 and can be configured to apply a load to the example schematic system 601 (e.g. in a direction shown by arrow 621) to vary the effective stiffness of the fifth example actuator 600. It is also to be understood that the fifth example actuator 600 can include a fifth example controller 602 having features the same as or similar to those of the first example controller 102, the third example controller 525, and the fourth example controller 575 described above and can be configured to implement the various methods of control, including but not limited to, force control of the fifth example actuator 600.

Figure 11:
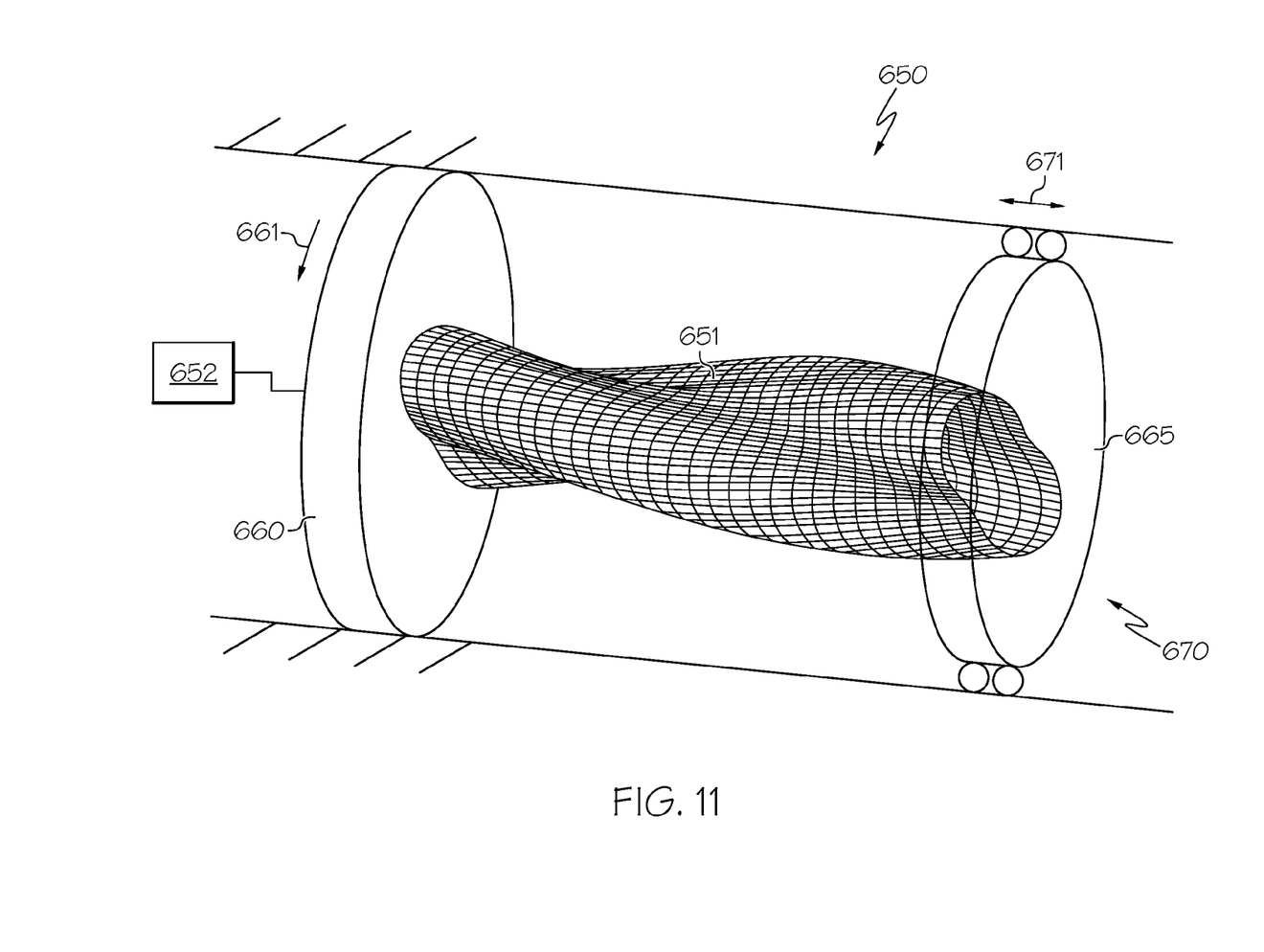
FIG. 11 illustrates an example actuator based on torsional buckling.

Referring to FIG. 11, a sixth example actuator 650 is provided with an effective stiffness (e.g. an effective rotary stiffness) based at least in part on non-linear deflection characteristics of torsional buckling. The sixth example actuator 650 can further include a sixth example positioning module 660 having features the same as or similar to those of the first example positioning module 110, the third example positioning module 510, the fourth example positioning module 560, and the fifth example positioning module 610 and can be configured to control a position of a sixth example end effector 665 by controlling a rotation of the sixth example positioning module 660 along a direction shown by arrow 661. The sixth example actuator 650 can also include a sixth example loading module 670 having features the same as or similar to those of the first example loading module 120, the third example loading module 520, the fourth example loading module 570, and the fifth example loading module 620 and can be configured to apply a load to an example beam 651 (e.g. in a direction shown by arrow 671) to vary the effective stiffness (e.g. an effective rotary stiffness) of the sixth example actuator 650. For example, when the sixth example loading module 670 applies a tensile axial force to the example beam 651, the effective rotary stiffness of the beam realized at the sixth example end effector 665 increases. Similarly, when the sixth example loading module 670 applies a compressive force to the example beam 651, a transverse stiffness of the beam (e.g. effective rotary stiffness) decreases. By applying compressive forces that are equal to or greater than a critical buckling load of the example beam 651, the beam can buckle and exhibit non-linear deflection characteristics of buckling. Thus, the transverse stiffness of the beam can be controlled to include at least one of a zero stiffness and a negative stiffness. In turn, the effective rotary stiffness of the sixth example actuator 650 can be varied to include a positive, zero, and negative effective rotary stiffness. It is also to be understood that the sixth example actuator 650 can include a sixth example controller 652 having features the same as or similar to those of the first example controller 102, the third example controller 525, the fourth example controller 575, and the fifth example controller 602 described above and can be configured to implement the various methods of control, including but not limited to, force control of the sixth example actuator 650.

Figure 12:
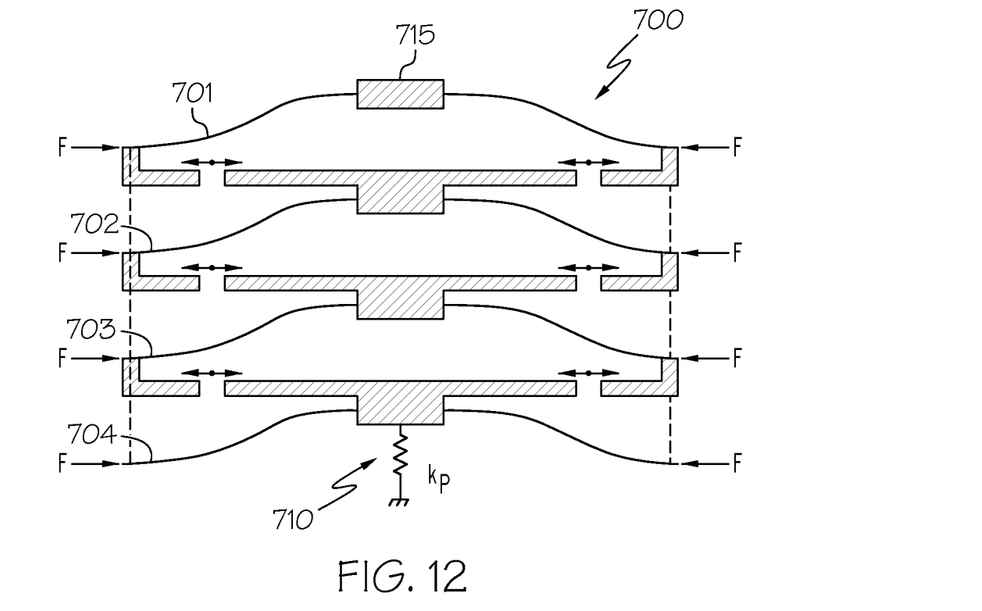
FIG. 12 illustrates a series implementation of an example actuator in accordance with the disclosure.

Turning to FIG. 12, a series implementation example actuator 700 is provided. The series implementation example actuator 700 can include a plurality of example members 701, 702, 703, 704 arranged in series with each other such that transverse deflection of each member can be superimposed. Thus, a load F applied axially to at least one of the plurality of members can cause the member to buckle and exhibit non-linear deflection characteristics of buckling. The effective stiffness (e.g. a stiffness at end effector 715) of the series implementation example actuator 700 can be based at least in part on the non-linear deflection characteristics of buckling according to the series implementation. As discussed above with respect to the various example actuators, the series implementation example actuator 700 can also include an optional spring 710 to set a nominal effective stiffness of the series implementation example actuator 700.

Figure 13:
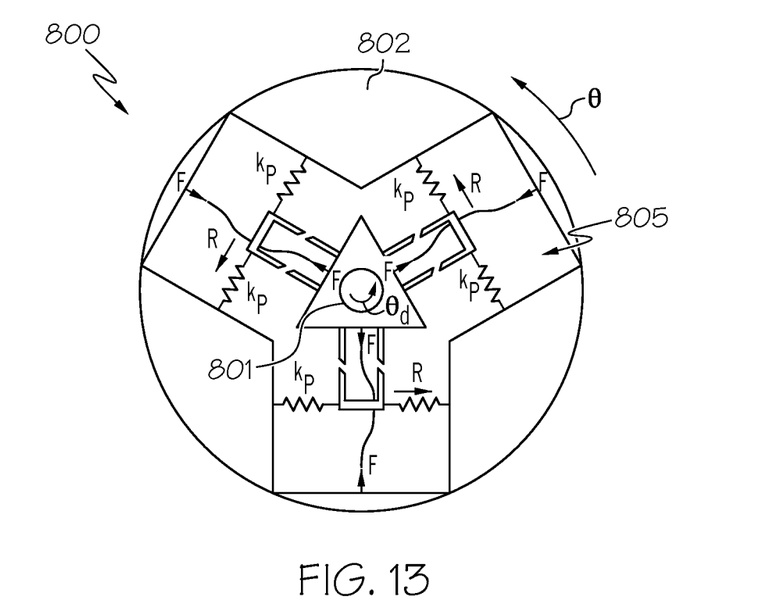
FIG. 13 illustrates a rotary implementation of an example actuator in accordance with the disclosure.

Referring to FIG. 13, a rotary implementation example actuator 800 is provided. The rotary implementation example actuator 800 can include an input disc 801 having a prescribed rotation represented as $Ø_d$ and a corresponding rotational stiffness. The rotary implementation example actuator 800 can further include one or more variable negative stiffness actuators 805 having features that are the same as or similar to the various example actuators described herein. The one or more variable negative stiffness actuators 805 can produce non-linear deflection characteristics of buckling which can define at least is part an effective rotational stiffness of an output disc 802 having a rotation Ø. The non-linear deflection characteristics of buckling can include buckling due to at least one of torsion, bending, compression, and tension, at least one of which can be used to vary the effective rotational stiffness of the rotary implementation example actuator 800.

Figure 14:
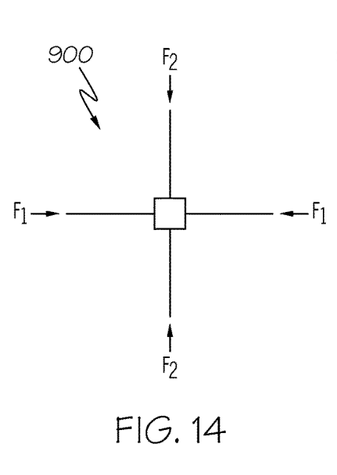
FIGS. 14-18 illustrate other example implementations of an example actuator in accordance with the disclosure.
Figure 15:
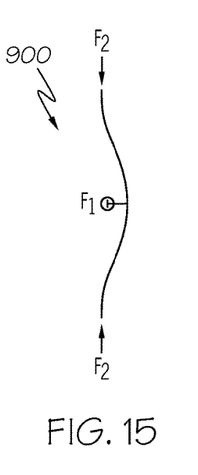
Figure 16:
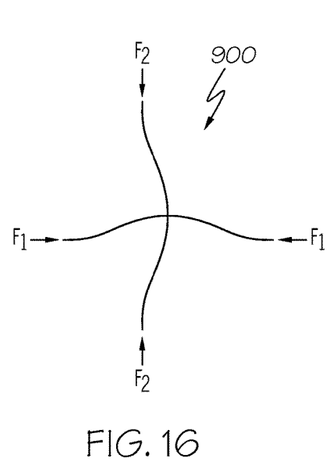
Figure 17:
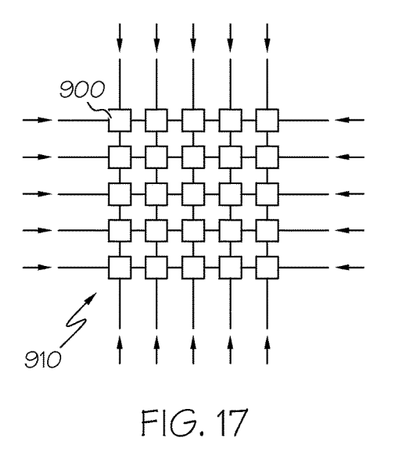
Figure 18:
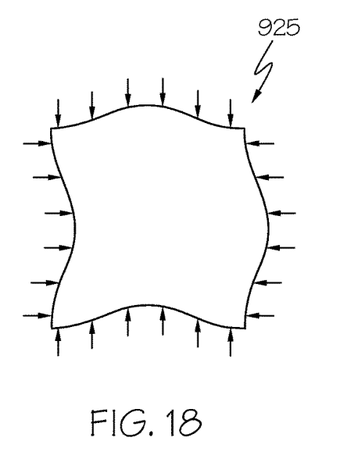

FIGS. 14-18 illustrate other example implementations of variable negative stiffness actuation. Referring to FIG. 14, a two-dimensional module 900 is provided, with out-of-plane buckling of the two-dimensional module 900 depicted in FIG. 15, and in-plane buckling of the two-dimensional module 900 depicted in FIG. 16. Referring to FIG. 17, a two-dimensional matrix 910 is provided that includes a plurality of two-dimensional modules 900 arranged together. In some examples, the two-dimensional matrix 910 can include multiple layers of modules. A continuous two-dimensional sheet 925 that can buckle and thus exhibit non-linear deflection characteristics of buckling is provided in FIG. 18. Such two-dimensional stiffness modulation can be implemented to provide force feedback in surface devices, including but not limited to, phones, tablets, and other electronic devices.

It will be apparent to those skilled in the art that various modifications and variations can be made to the present disclosure without departing from the spirit and scope of the subject matter claimed.

What is claimed is:

1. A method of controlling an effective stiffness of a single actuator comprising:
    providing an actuator; and
    varying a positive effective stiffness of the actuator based at least in part on non-linear deflection characteristics of buckling that includes independently controlling a negative stiffness,
    wherein varying the positive effective stiffness comprises applying a load to a member to vary the stiffness of the member, wherein the load causes the member to buckle, wherein the buckling of the member defines at least in part the non-linear deflection characteristics of buckling, and wherein the member is selected from the group consisting of a beam, a shaft, a column, a rod, a spring, a plate or a shell.

2. The method of claim 1, wherein the load is a compressive load.

3. The method of claim 1, wherein the load is a tensile load.

4. The method of claim 1, wherein the load is a bending load.

5. The method of claim 1, wherein the load is a torsional load.

6. The method of claim 1, wherein the stiffness of the member is based at least in part on the non-linear deflection characteristics of buckling, and wherein varying the stiffness of the member varies the effective stiffness of the actuator.

7. The method of claim 1, further comprising:
controlling a position of an end effector of the actuator based at least in part on a force applied to the end effector.

8. The method of claim 7, wherein the force applied to the end effector causes a deflection of the end effector, and the method further comprises:
estimating the force applied to the end effector based at least in part on the deflection of the end effector and the effective stiffness of the actuator; and
controlling the position of the end effector based at least in part on the estimated force.

9. A method of varying a positive effective stiffness of an actuator comprising:
applying a load to a member, wherein the load causes the member to buckle, and wherein the buckling produces non-linear deflection of the member that includes a variable negative stiffness, and
varying an effective stiffness of the actuator based at least in part on controlling the variable negative stiffness.

10. The method of claim 9, wherein a stiffness of the member is based at least in part on the non-linear deflection of the member, the method further comprising:
varying the stiffness of the member, wherein varying the stiffness of the member varies the effective stiffness of the actuator.

11. The method of claim 9, further comprising varying the effective stiffness of the actuator not based at least in part on non-linear deflection of the member.

12. An actuator comprising:
a member defining at least in part a positive effective stiffness of the actuator, the member is selected from the group consisting of a beam, a shaft, a column, a rod, a spring, a plate or a shell;
a loading actuator connected to the member and configured to apply a load to the member, wherein the load causes the member to buckle, wherein the buckling produces non-linear deflection of the member that includes variable negative stiffness, and wherein the effective stiffness of the actuator is based at least in part on variable negative stiffness; and
a controller configured to vary a stiffness, including varying the negative stiffness, of the member, wherein varying the stiffness of the member varies the effective stiffness of the actuator.

13. The actuator of claim 12, wherein the loading actuator is configured to apply at least one of a compressive load, a tensile load, a bending load, and a torsional load to the member.

14. The actuator of claim 12, further comprising:
an end effector connected to the member, and
a positioning actuator configured to control a position of the end effector.

15. The actuator of claim 14, wherein the positioning actuator is configured to control the position of the end effector based at least in part on a force applied to the end effector.

16. The actuator of claim 15, wherein the force applied to the end effector causes a deflection of the end effector, wherein the controller is configured to estimate the force applied to the end effector based at least in part on the deflection of the end effector and the effective stiffness of the actuator, and wherein the positioning actuator is configured to control the position of the end effector based at least in part on the estimated force.

* * * * *